J. FOWLER.
MEAT HANGER.
APPLICATION FILED JULY 12, 1909.

947,016.

Patented Jan. 18, 1910.

WITNESSES

INVENTOR
Jacob Fowler
BY
ATTORNEYS

UNITED STATES PATENT OFFICE.

JACOB FOWLER, OF NEW YORK, N. Y.

MEAT-HANGER.

947,016.  Specification of Letters Patent.  Patented Jan. 18, 1910.

Application filed July 12, 1909. Serial No. 507,143.

*To all whom it may concern:*

Be it known that I, JACOB FOWLER, a citizen of the United States, and a resident of the city of New York, borough of Manhattan, in the county and State of New York, have invented a new and Improved Meat-Hanger, of which the following is a full, clear, and exact description.

The invention is an improvement in meat hangers and has in view a hanger in the nature of a clasp which is adapted to be easily applied to and detached from a side of bacon or other similarly-shaped piece of meat, and operates to firmly press on the meat at each side and give it the desired shape.

Reference is to be had to the accompanying drawings forming a part of this specification, in which similar characters of reference indicate corresponding parts in both views.

Figure 1:
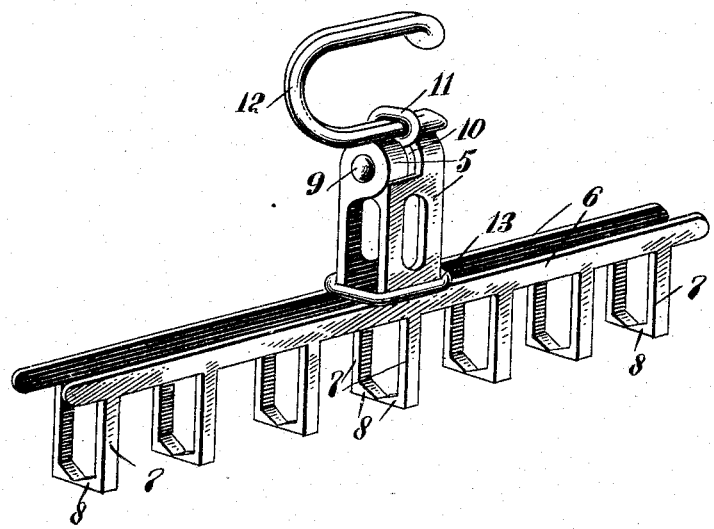
Figure 2:
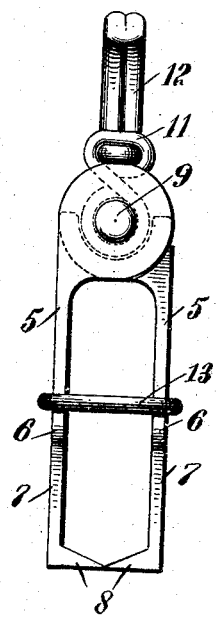

Figure 1 is a perspective view of a meat hanger constructed in accordance with my invention; and Fig. 2 is an end view of the same.

The meat hanger comprises two jaws between which the side of bacon or other similarly-shaped piece of meat is adapted to be clasped and held flattened out, each jaw comprising a shank 5, a relatively long presser bar 6, to which the shank is centrally secured, and presser fingers 7 depending from the presser bar 6 at intervals of its length and provided with inwardly-directed biting or impaling teeth 8 at their lower ends, the fingers of the two bars being oppositely arranged. The presser bars are preferably flattened, with the wide faces of the bars facing each other so as to give a substantial bearing on the meat. The shanks 5 of the jaws are rounded off at the top and each cut away on its inner face to receive the rounded portion of the other shank, and are connected together by a pivot pin 9, adapting the jaws to be swung to and from each other, with the presser bars maintaining approximate parallelism in the pivotal movement. The inner faces of the shanks 5 at the pivotal connection are cut away sufficiently to provide a slot or space 10 between the rounded ends of the shank, in which is received the shank 11 of a hook 12, the hook shank embracing the pivot pin 9, as shown in dotted outline in Fig. 2, and having a loop in embrace with the body of the hook, the latter being extended to project slightly beyond the outer faces of the shanks of the jaws to prevent the accidental dropping off and the consequent loss of a locking ring 13 which is slidable on the shank 5.

In the application of the hanger to the meat, the locking ring 13 is moved toward the hook 12 and the jaws swung apart, in which position they are passed over the edge of the meat and afterward forced together, bringing the presser bars and fingers into contact with the opposite faces of the meat, keeping the latter in substantially its original shape, the teeth passing into the meat and preventing the same from being pulled from the hanger after the ring is moved to the presser bars. The hanger is then suspended by the hook 12, generally in the smoke house or other place of curing or storing the meat.

Having thus described my invention, I claim as new and desire to secure by Letters Patent:

1. In a meat hanger, jaws, pivoted together to swing to and from each other in successive parallel positions and adapted to receive the meat therebetween, the jaws each having presser bars and impaling teeth, said bars being flattened, with their wide faces facing each other and constructed to bear flat on the opposite faces of the meat for their full length.

2. In a meat hanger, jaws pivoted together to swing to and from each other and adapted to receive the meat therebetween, each jaw having a presser bar provided with depending fingers at intervals of its length, with each finger having an inwardly-turned tooth.

3. In a meat hanger, jaws, each comprising a shank, a presser bar to which the shank is substantially centrally connected and fingers depending from the bar at intervals of its length, having inwardly-projecting teeth, a pivot pin connecting the jaws together through the outer ends of the shanks, a ring slidable on the shanks to hold the jaws closed, and a hook to suspend the hanger, having a shank connected to the pivot pin between the shanks of the jaws and extended beyond the outer faces of the said shanks to prevent the removal of the ring.

4. In a meat hanger, jaws pivoted together to swing to and from each other and adapted to receive the meat therebetween, each jaw having a presser bar provided with depending fingers at intervals of its length, the fingers having directly opposed impaling teeth, with the teeth of the fingers of the two bars arranged in abutting position.

5. In a meat hanger, jaws having a pivotal connection adapting them to swing to and from each other, each jaw having a presser bar to shape the meat and provided with impaling teeth, with the teeth arranged a substantial distance farther from the pivotal connection than the presser-bar.

In testimony whereof I have signed my name to this specification in the presence of two subscribing witnesses.

JACOB FOWLER.

Witnesses:
F. W. HANAFORD,
PHILIP D. ROLLHAUS.